Nov. 5, 1929.                R. N. BUTTENUTH                1,734,761
                                  COVER
                            Filed Jan. 9, 1928

INVENTOR.
ROBERT N. BUTTENUTH
BY
ATTORNEY

Patented Nov. 5, 1929

1,734,761

UNITED STATES PATENT OFFICE

ROBERT N. BUTTENUTH, OF NEW YORK, N. Y.

COVER

Application filed January 9, 1928. Serial No. 245,559.

This invention relates to covers and the like with particular reference to such as are used for protecting occupants of public conveyances from dirt, disease etc., which may be carried by the seats.

Occupants of such vehicles, particularly taxis, never know who occupied the seat before his or her entrance therein. This previous occupant might have been affected with some contagious disease which if allowed to come in contact with succeeding passengers, might spread.

A further disadvantage of bare seats resides in the fact that they are contractors of dust, etc. which easily settles in the clothes of the passengers.

It is therefore the main object of this invention to provide means to freshly cover the seat of such conveyances after each passenger has left the same so as to protect the next, succeeding occupant.

A further object is in the provision of means to prevent more than the necessary length of covering to be withdrawn at one time.

A still further aim is to provide means enabling ready separation of the used portion of the cover from the fresh clean part.

These objects are attained by the novel construction, combination, and arrangement of few and simple parts hereinafter described and illustrated in the associated drawing, forming a material part of this disclosure and in which:—

Figure 1:
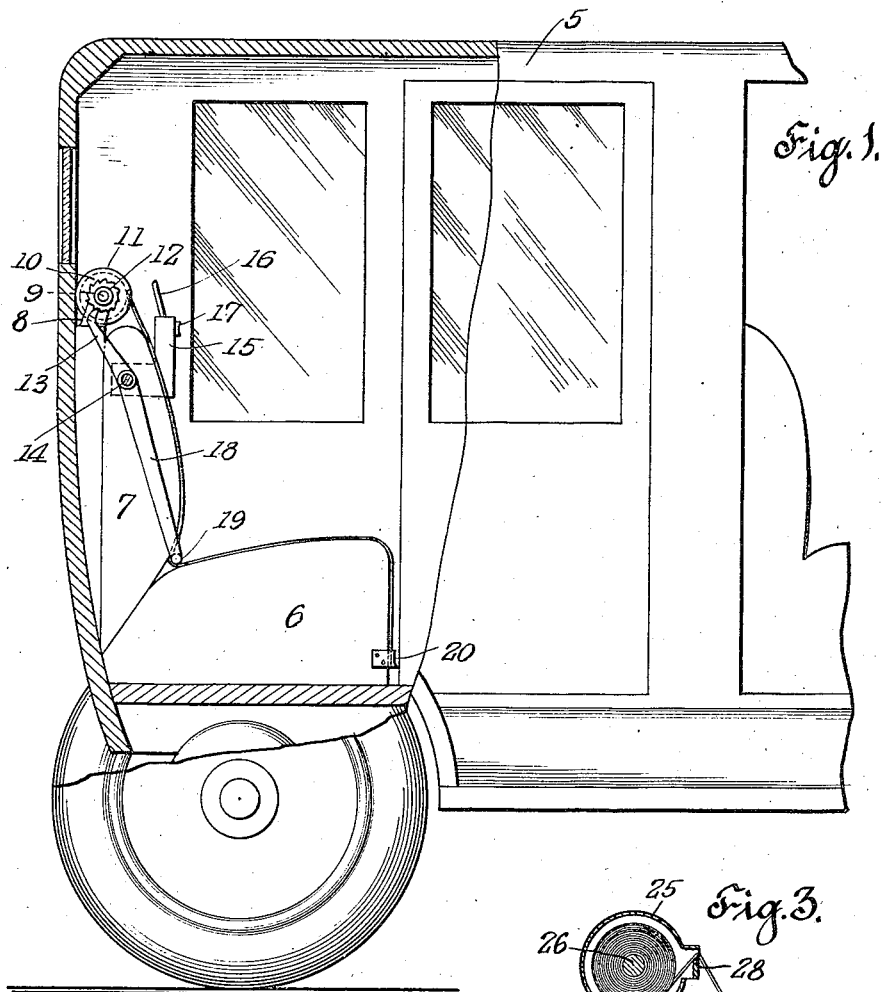
Figure 1 is a fragmentary side elevational view of an automobile body having a rear seat equipped with the preferred form of this invention, parts being broken away to show the inner construction.

In the drawing the numeral 5 generally designates a conventional automobile body, such as is used on taxi cabs, equipped with the usual seat 6 having a back rest 7 above which is disposed a pair of lugs 8, on either side of the rest, carrying therebetween a roller 9 supporting a roll of paper 10, the whole being disposed in a cylindrical casing 11.

Fixed on the roller 9 intermediate the paper and the supporting lugs are ratchet wheels 12 engageable with dogs 13, fixed upon studs 14 rotatably mounted in the side of the back rest 7.

One of the studs is connected to any preferred coined mechanism contained in a casing 15 fixed to the side wall of the cab body and actuated by a lever 16 which releases the dog 13 from engagement with the ratchet 12 upon the insertion of a coin into the slot 17.

Also fixed to the studs 14 are a pair of arms 18 extending downwardly at an angle along the sides of the rest 7 and connected at their lower ends by a rod 19, disposed along the meeting point of seat 6 and rest 7.

The end of the paper 10 passes out of the casing 11 through an opening therein to extend, over the front surface of the back rest under the bar 19 and over the surface of the seat 6, its free end being disposed beneath a strap clamp 20 fixed on the front lower part of the seat, the same acting as the knife-edge as will be seen.

Thus, each time a passenger enters a cab, if he desires to cover the seat, by the insertion of a coin through slot 17, by operation of lever 16 he releases the dog from engagement with its ratchet.

Obviously by pulling on the lower free end of the paper held by the clamp 20 while holding lever 16 the dog 13 will be disengaged from the ratchet 12 permitting the paper to be moved to present a fresh covering over the seat and back rest, and by pulling upwardly against the lower edge of the clamp 20, the old cover may be torn off.

Figure 3:
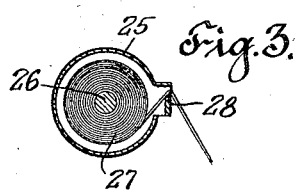
Figure 3 is a transverse sectional view of a modified form of cover dispenser.
Figure 2:
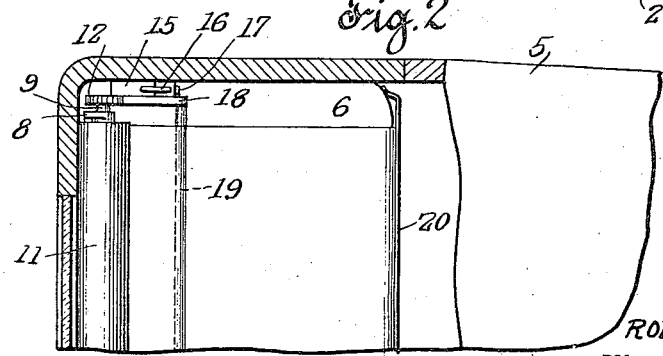
Figure 2 is a fragmentary top plan view of the same.

In the modification, shown in Figure 3, no coin mechanism is employed, the numeral 25 designating a casing having a roller 26, journalled therein carrying a roll of paper 27, the same being perforated, to permit ready separation, at uniformly spaced distances equal to the length of paper necessary to cover the seat and back rest.

The free end of the roll 27 passes through an opening in the casing and rests upon the knife-edge 28, fixed at the bottom of the opening.

In this case, instead of a coin mechanism to stop the movement of the paper when a sufficient amount has been withdrawn, the user is guided by the perforations and is expected to be honest with respect to the amount of paper he withdraws.

From the foregoing it will be noted that by the use of such covers over the seats of public conveyances, the spreading of dust, dirt, disease, etc. may be minimized, so as to protect the public to the fullest extent.

While the preferred embodiments of my invention have been described in detail it is to be understood that changes may be made within the spirit and scope of the claims hereto appended so that the above is not to be interpreted in a limiting sense.

Having thus described my invention, what I claim as new and desire to secure by Letters Patent is:—

1. A mechanism for dispensing from a continuous roll an individual sanitary integral back and seat cover comprising a support, a roll of paper journalled in said support, ratchet wheels fixed on said roll, studs rotatably mounted on the side of the seat, dogs on said studs engageable with said ratchets, a pair of arms fixed on said studs, a guide bar connecting the free ends of said arms to hold said cover tightly against the meeting point of the seat and its back, and a strap fixed to the front surface of the seat to retain said cover in position.

2. A mechanism for dispensing from a continuous roll an individual sanitary integral back and seat cover comprising a casing having an opening, a roller journalled therein, a roll of paper carried by said roller, said paper being perforated at uniformly spaced distances, and a knife-edged member fixed to said casing over which said paper passes, a pair of arms pivotally attached to the sides of said seat, a guide bar connecting the free ends of said arms to hold said cover tightly against the meeting point of the seat and its back.

3. In a sanitary seat cover, a casing having an opening, a roller journalled therein, adapted to carry a roll of paper, and means attached to the sides of said seat to hold said cover tightly against the meeting point of the seat and its back, said means comprising a pair of downwardly extending arms rotatably mounted in the sides of said seat, and a guide rod connecting the lower ends of said arms and disposed along the meeting point of said seat and its back.

4. A sanitary seat cover comprising a casing having an opening, a roller journalled therein, a roll of paper carried by said roller, means attached to the sides of said seat to hold said cover tightly against the meeting point of the seat and its back, said means comprising a pair of downwardly extending arms rotatably mounted in the sides of said seat, and a guide rod connecting the lower ends of said arms and disposed along the meeting point of said seat and its back, and means fixed to the front surface of said seat to retain said cover in position.

5. A mechanism for dispensing from a continuous roll an individual sanitary integral back rest and seat cover comprising a roller mounted at the top of said back rest, a roll of paper supported by said roller, a cylindrical casing enclosing said roller and roll of paper, said casing having a longitudinal slot through which the free end of said roll of paper is passed, ratchet wheels fixed on said roller, studs rotatably mounted in the sides of said back rest, dogs fixed upon said studs, adapted to engage said ratchet wheels, a pair of downwardly extending arms fixed to said studs, said arms being disposed along the sides of said back rest, a guide rod connecting the lower ends of said arms and disposed along the meeting point of said seat and said back rest, and a knife-edge clamp fixed to the front lower portion of said seat, the aforesaid roll of paper being adapted to extend over the front surface of the back rest under said rod and over the surface of the seat, and beneath said knife-edge clamp.

6. A mechanism for dispensing from a continuous roll an individual sanitary integral back and seat cover comprising a roller mounted at the top of said back, a roll of paper supported by said roller, a pair of downwardly extending arms rotatably mounted in said back, a guide rod connecting the lower ends of said arms and disposed along the meeting point of said seat and back, and a knife-edge clamp fixed to the front portion of said seat, whereby said roll of paper when extended over the front surface of the back and seat will be held tightly against the said meeting point and under said clamp.

Signed at New York, in the county of New York and State of New York, this 30th day of August, 1927.

ROBERT N. BUTTENUTH.